United States Patent
Zeng et al.

(10) Patent No.: US 10,531,149 B2
(45) Date of Patent: Jan. 7, 2020

(54) METHOD AND SYSTEM FOR MANAGING BUFFERS

(71) Applicant: Alibaba Group Holding Limited, George Town (KY)

(72) Inventors: Li Zeng, Hangzhou (CN); Aihua Zhao, Hangzhou (CN); Jiangwei Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 124 days.

(21) Appl. No.: 15/815,527

(22) Filed: Nov. 16, 2017

(65) Prior Publication Data

US 2018/0146243 A1  May 24, 2018

(30) Foreign Application Priority Data

Nov. 21, 2016 (CN) .......................... 2016 1 1021677

(51) Int. Cl.
| | |
|---|---|
| *G11B 27/34* | (2006.01) |
| *H04N 21/44* | (2011.01) |
| *G11B 20/10* | (2006.01) |
| *H04N 19/423* | (2014.01) |
| *H04N 19/44* | (2014.01) |

(52) U.S. Cl.
CPC . *H04N 21/44004* (2013.01); *G11B 20/10527* (2013.01); *G11B 27/34* (2013.01); *H04N 19/423* (2014.11); *H04N 19/44* (2014.11)

(58) Field of Classification Search
None
See application file for complete search history.

(56) References Cited

U.S. PATENT DOCUMENTS

| | | | |
|---|---|---|---|
| 5,995,120 A | 11/1999 | Dye | |
| 6,100,906 A | 8/2000 | Asaro | |
| 6,111,584 A | 8/2000 | Murphy | |
| 6,873,629 B2 | 3/2005 | Morris | |
| 9,317,175 B1* | 4/2016 | Lockhart | G06F 3/04815 |
| 9,392,042 B1 | 7/2016 | Caballero | |
| 2005/0097620 A1* | 5/2005 | Fye | H04N 5/44591 |
| | | | 725/118 |
| 2007/0097257 A1 | 5/2007 | El-Maleh | |
| 2012/0089992 A1* | 4/2012 | Reeves | G06F 3/1431 |
| | | | 719/318 |

FOREIGN PATENT DOCUMENTS

WO    WO-2015180448    12/2015

* cited by examiner

*Primary Examiner* — Eileen M Adams
(74) *Attorney, Agent, or Firm* — Van Pelt, Yi & James LLP

(57) ABSTRACT

Rendering video is disclosed including responding to an access request from a video data provider using a first video buffer queue corresponding to a first rendering technique, receiving a request to change the first rendering technique to a second rendering technique, and switching the first video buffer queue for the access request to a second video buffer queue corresponding to the second rendering technique, the first video buffer queue and the second video buffer queue being concurrent.

15 Claims, 6 Drawing Sheets

METHOD AND SYSTEM FOR MANAGING BUFFERS

CROSS REFERENCE TO OTHER APPLICATIONS

This application claims priority to People's Republic of China Patent Application No. 201611021677.9 entitled METHOD, MEANS AND SYSTEM FOR MANAGING BUFFERS, filed Nov. 21, 2016 which is incorporated herein by reference for all purposes.

FIELD OF THE INVENTION

The present application relates to a method and a system for managing buffers.

BACKGROUND OF THE INVENTION

When playing videos, video buffer queues (e.g., BufferQueue class in Java) are typically used during the process of playing videos. The video buffer queues externally provide producer interfaces that request buffers to put uncompressed video data and consumer interfaces that acquire buffers for display or further processing. The producer interface relates to an interface that de-queues emptied buffers to be filled with data and queues filled buffers. The consumer interface relates to an interface that accepts data for display or further processing. The BufferQueue includes a number of buffer units (or buffer blocks). The buffer units relate to units of memory. Empty buffer units within the BufferQueue are available to video data providers, e.g., video decoders. Filled buffer units are generated by filling the buffer units via a producer interface. In this context, filled buffer units include uncompressed video data. For consumers (e.g., threads or processes that handle video data), videos are rendered by reading the filled buffer units via a consumer interface. For example, various video rendering techniques can be differentiated based on different corresponding consumers. For example, the video rendering techniques include a SurfaceView rendering technique (e.g., implemented using a SurfaceView class in Android Java library) and a TextureView rendering technique (e.g., implemented using a TextureView class in Android Java Library). In the SurfaceView rendering technique, system graphic compositors (such as Android's SurfaceFlinger or Linux's Xserver/Weston) are the consumers. FIG. 1 is a diagram of an embodiment of a conventional process for rendering video using a SurfaceView rendering technique. A video decoder causes empty buffer units to exit from a video buffer queue (operation 1), fills the empty buffer units (operation 2), and causes filled buffer units to enter into the video buffer queue (operation 3). The system compositor obtains the filled buffer units from the video buffer queue (operation 4), renders video data from the filled buffer units (operation 5), and returns the empty buffer units to the video buffer queue (operation 6).

FIG. 2 is a diagram of an embodiment of a conventional process for rendering video using a TextureView rendering technique. In the TextureView rendering technique, similar initial operations are performed as in the SurfaceView rendering technique (operations 1-3). A rendering unit of a video-playing application obtains the filled buffer units from the video buffer queue (operation 4), renders video data from the filled buffer units (operation 5), and returns the empty buffer units to the video buffer queue (operation 6). The system compositor receives the rendered video data and presents the rendering result (operations 7 and 8). In the TextureView rendering technique, rendering units of video-playing applications are the consumers.

When video buffer queues (e.g., the BufferQueue objects) are created, the video buffer queues are bound to the consumers. A consumer could be a system graphic compositor or a rendering unit of a video-playing application. When switching the rendering technique during the process of playing a video, the current BufferQueue is always destroyed. Subsequently, a new BufferQueue is created, and the relevant technique for playing the video can be restored after the completion of the destruction of the current BufferQueue. During the switching of the rendering techniques, additional operations to create a new BufferQueue and allocate memory are performed. The performance of the additional operations affects execution efficiency and the video-playing technique result does not flow smoothly. A user can sense that the video is being interrupted and sticking in places as the video is being played. The user's experience is diminished as a result.

BRIEF DESCRIPTION OF THE DRAWINGS

Various embodiments of the invention are disclosed in the following detailed description and the accompanying drawings.

DETAILED DESCRIPTION

Figure 1:
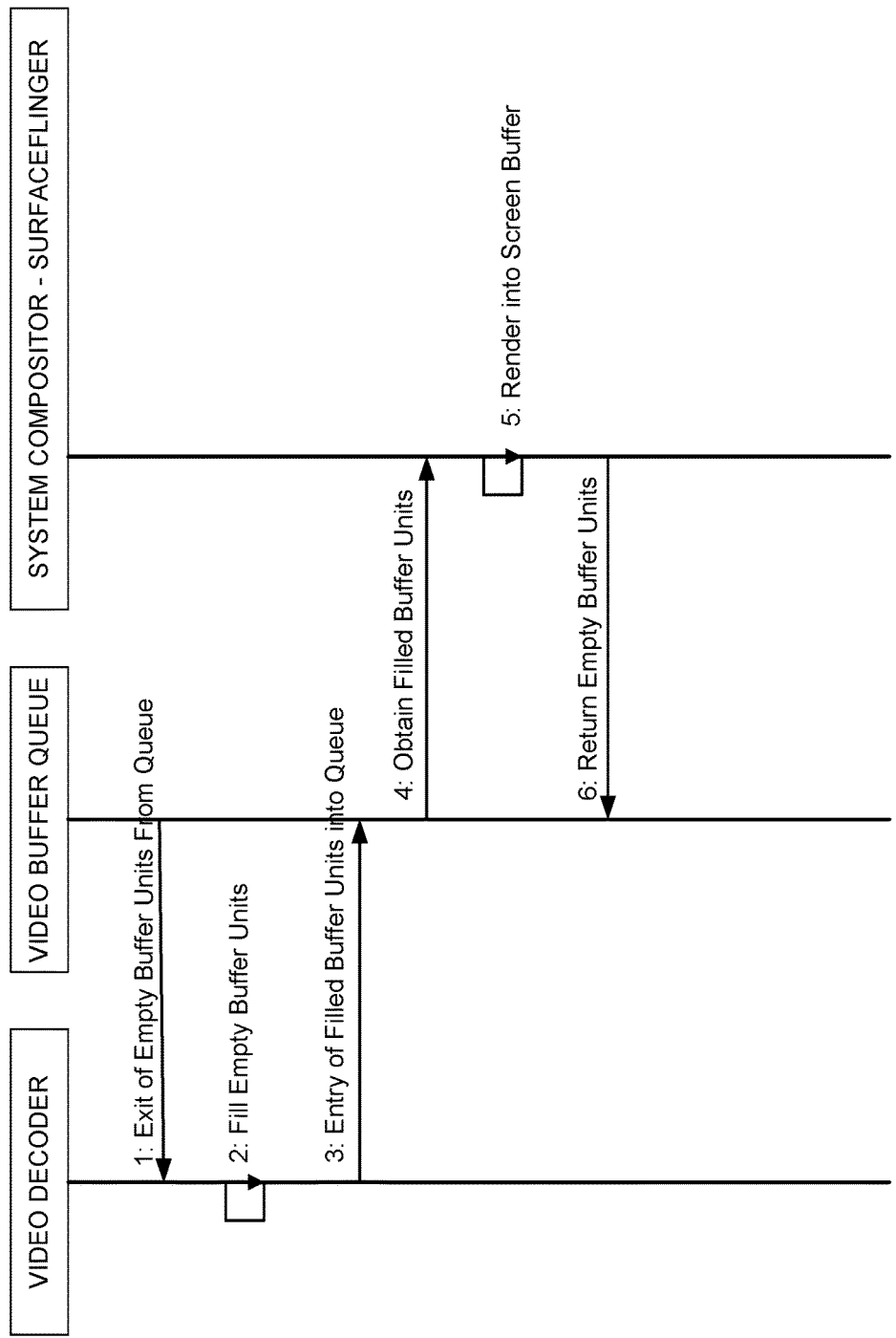
FIG. 1 is a diagram of an embodiment of a conventional process for rendering video using a SurfaceView rendering technique.
Figure 2:
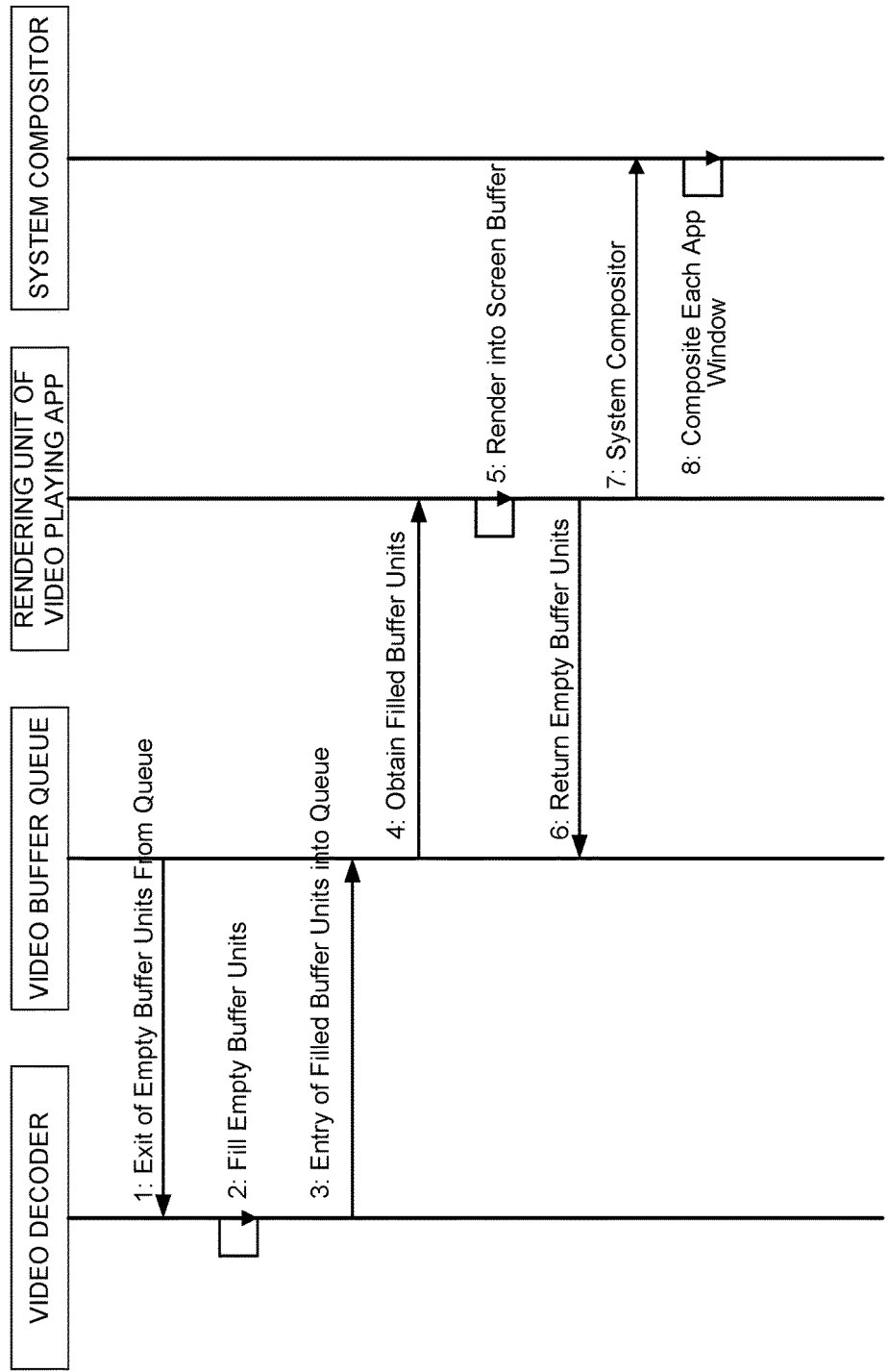
FIG. 2 is a diagram of an embodiment of a conventional process for rendering video using a TextureView rendering technique.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventionally, when a video is played, a video buffer queue is, typically, created in advance. A producer (e.g., a video data provider) or a consumer (e.g. a rendering unit of a video processing application) access the video buffer queue via a corresponding producer or consumer interface. The producer fills empty buffer units with video image data that is to be rendered and displayed. The consumer performs the video rendering using the video image data from the filled buffer units.

If the video rendering technique is changed during the video-playing technique, conventional video-playing techniques typically perform the following: since various video rendering techniques correspond to different consumers, and a video buffer queue is bound to a corresponding consumer, the original video buffer queue is typically destroyed each time the video rendering technique is changed. Subsequently, a new video buffer queue bound to the consumer corresponding to the changed video rendering technique is created, and memory is allocated to the new video buffer queue for performing buffer queue operations. Thus, the conventional video-playing technique employs a single queue-based processing technique. Therefore, each time the video rendering technique is changed, destroying an original video buffer queue is to be performed, recreating a new video buffer queue is to be performed, and an allocating memory operation is to be performed. Subsequently, playing a video using a conventional video-playing technique does not flow smoothly when the rendering technique is changed.

On the other hand, the present application utilizes a pair of queues concurrently to play video. As an example, a process for rendering video is responsible for managing two video buffer queues that correspond separately to different rendering techniques. Upon receiving a request to change the rendering technique, the process performs a queue switching operation and thus responds to an access request from a video data provider based on the corresponding video buffer queue.

Because the present application utilized a pair of queues, performing operations such as destroying a queue, recreating a queue, and allocating memory each time the rendering technique is changed is not required. As a result, smooth video-playing is assured even in the event that the rendering technique is changed. Moreover, the rendering of video is transparent to video data providers. In other words, the rendering of the video does not affect the original access mode of the video data providers to the video buffer queues. In other words, the producer interface does not change, and thus changing the code for the video data provider is not required. Since the changing of the code is not required, a reduction in a developer's workload can occur.

"Video data providers" can refer to units that provide the video image data that is to be rendered and displayed and can include, but is not limited to video decoders, video processors, or the like.

Figure 3:
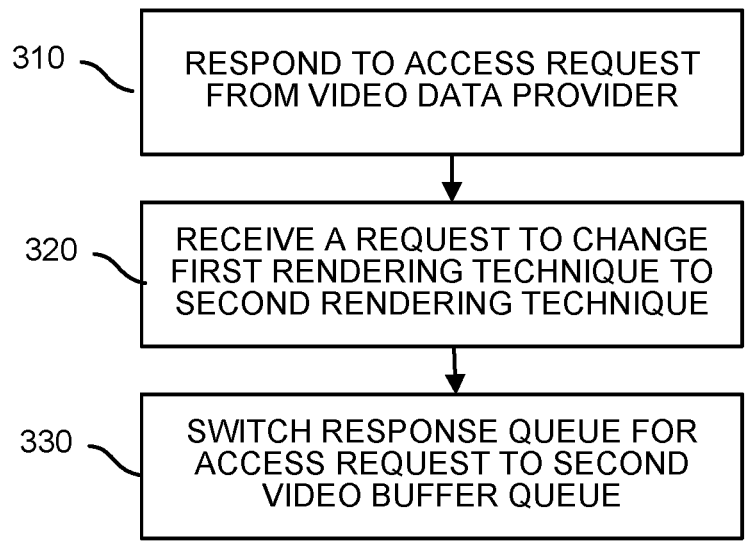
FIG. 3 is a flowchart of an embodiment of a process for rendering video.

FIG. 3 is a flowchart of an embodiment of a process for rendering video. In some embodiments, the process 300 is implemented by the system 500 of FIG. 5 and comprises:

Prior to performing operation 310, a video buffer queue is created. The video buffer queue can be created by, for example, a video-playing control unit 510 (e.g., a rendering unit of a video-playing application) of system 500. The creating of the video buffer queue is also called initialization. In some embodiments, initialization includes:

As an example, before beginning to play a video, the video-playing control unit creates a first video buffer queue (BufferQueue1) corresponding to a first rendering technique and a second video buffer queue (BufferQueue2) corresponding to a second rendering technique. In some implementations, the first video buffer queue and the second video buffer queue can be created by calling a corresponding interface or function provided by the system. Moreover, BufferQueue1 is bound to a first consumer corresponding to the first rendering technique, and BufferQueue2 is bound to a second consumer corresponding to the second rendering technique.

Then, memory is allocated for a first preset number of buffer units and added to the video buffer queue corresponding to a preset initial rendering technique. The previously created first video buffer queue and second video buffer queue can be empty queues without any buffer units. Therefore, memory can be allocated for a first preset number of buffer units and added to the video buffer queue corresponding to the initial rendering technique. In some embodiments, the first preset number can be set based on actual need. For example, the first preset number can be set at 8.

The buffer units added to the video buffer queue are free. In some implementations, a corresponding value can be set to a flag of each buffer unit, thus labeling the buffer units as empty buffer units. Using a similar logic, filled buffer units can be labeled in a similar manner. The logic for setting the flags of the free and filled buffer units are understood in the art and will not be further discussed for conciseness.

The first video buffer queue and the second video buffer queue can share a set of buffer units, or each video buffer queue can have its own set of buffer units. The technique of sharing buffer units can be done immediately upon completion of the above initialization operation. In other words, buffer units can be simply added to the video buffer queue corresponding to the initial rendering technique. As an example, after adding a buffer to one video buffer queue, the buffer can then enter another video buffer queue via the producer interface or exit the one video buffer queue via the consumer interface. In another example, if buffer sharing is supported, after adding the buffer to one video buffer queue, the buffer can then be added to another video buffer queue. If the sharing technique is not adopted, then a similar approach can be adopted for allocating memory for a second preset number of buffer units and adding the allocated memory to another video buffer queue. In some implementations, the first preset number and the second preset number can be the same or different.

For example, the first rendering technique corresponds to a TextureView rendering technique, and the second rendering technique corresponds to a SurfaceView rendering technique. The preset initial rendering technique corresponds to the TextureView rendering technique. Thus, a first video buffer queue corresponding to the TextureView rendering technique and a second video buffer queue corresponding to the SurfaceView rendering technique can be created. Memory can be allocated for a preset number of buffer units, and the allocated buffer units can be added to the first video buffer queue. A non-sharing technique can build on the foundation described above by allocating memory for a second preset number of buffer units and adding the allocated buffer units to the second video buffer queue.

Thus, using a video-playing controller to create a pair of queues prior to playing video has been described. In another implementation, the video-playing controller can, prior to playing video, simply create, based on the approach described above, a video buffer queue corresponding to the initial rendering technique and then, upon detecting a trigger event, cause the initial rendering technique to change to another rendering technique, again based on the approach described above to create a video buffer queue corresponding to the other rendering technique. In this way, creating a pair of queues can also be completed.

In 310, the system responds to an access request from a video data provider based on a first video buffer queue corresponding to a first rendering technique.

In some embodiments, the responding of the access request uses the first video buffer queue corresponding to the first rendering technique to respond to a data request from a video decoder to create filled buffer units in the first video buffer queue available to the corresponding first consumer for performing video rendering.

Under the control of the video-playing control unit, a video decoder can perform the video decoding operation, access the video buffer queue via the video buffer queue producer interface, and write the decoded video image data into the video buffer queue. Typically, two types of video decoder access requests for video buffer queues exist: 1) for empty buffer units to exit a queue and 2) for filled buffer units to enter a queue. When using the first rendering technique, the first video buffer queue is used to respond to the access request from the video decoder.

As an example, when a video decoder generates a frame of video image data to be rendered and displayed, the video decoder can request an empty buffer unit to exit the queue via the video buffer queue producer interface. This operation uses a first video buffer queue to respond. In other words, the video decoder gets an empty buffer unit from the first video buffer queue. The video decoder writes the generated video image data into the empty buffer unit and sends, via the producer interface, a request for the filled buffer unit to enter the queue. This operation uses the first video buffer queue to respond. In other words, the first consumer adds the filled buffer unit into the first video buffer queue.

After the filled buffer unit enters the queue, the first consumer bound to the first rendering technique can acquire a filled buffer unit from the first video buffer queue and use the data in the acquired filled buffer unit to perform the video rendering operation. After the rendering of the video finishes, the empty buffer unit is returned to the first video buffer queue.

When the first rendering technique is the TextureView rendering technique, the first consumer can be a rendering unit included in the video-playing application itself. The rendering unit included in the video-playing application itself takes the data in the filled buffer units acquired from the first video buffer queue and renders, using 3D graphics library OpenGL and other such technologies, the data with the TextureView rendering technique into the video-playing application's window buffer. Then, the system graphics compositor performs a compositing and rendering, and presents the rendering result on a display device.

When the first rendering technique is the SurfaceView rendering technique, the first consumer, typically, is a system graphics compositor. For example, in the Android system, the system graphics compositor is SurfaceFlinger. In the Linux system, the system graphics compositor is Xserver or Weston. The system compositor takes the data in the filled buffer units acquired from the first video buffer queue and composites and renders the data together with other user interface (UI) data that is to be rendered. Thereupon, the rendered video is presented on a display device.

The technique provided by the process 300 maintains two video buffer queues. In some implementations, the video buffer queue can, according to a preset marker value, be used to respond to the access request from the video decoder for the video buffer queue producer interface. For example, when the preset marker=1, the video decoder responds with the first video buffer queue.

In 320, the system receives a request to change the first rendering technique to a second rendering technique.

The system can receive a request sent from the video-playing controller to change the first rendering technique to the second rendering technique. In some implementations, the video-playing controller can detect various kinds of incidents in the video-playing process and trigger the corresponding treatment, for example, adjusting playing speed, adjusting volume, etc. If the video-playing controller detects a triggering event causing the first rendering technique to change to the second rendering technique, then the video-playing controller can issue a request to change the first rendering technique to the second rendering technique. The system is to then receive this request.

As an example, the triggering event includes: a change from full-screen playing mode to small-screen playing mode or a change from small-screen playing mode to full-screen playing mode. For example, in the event that the small-screen playing mode (such as in a nested web page) is used to play video, the first rendering technique is the Texture-View rendering technique. In the event that, at this time, the user clicks or activates a button corresponding to "full-screen playing" mode displayed on the video-playing interface, the video-playing controller then detects a triggering event for changing the TextureView rendering technique to the SurfaceView rendering technique. In another example, in the event that, while video is being played with the full-screen mode, the user performs an operation corresponding to "return to small-screen playing mode" (e.g., a double-click operation), the video-playing controller detects a triggering event for changing the SurfaceView rendering technique to the TextureView rendering technique.

Triggering events based on full-screen/small-screen playing modes were presented above as examples of changing rendering techniques. In some implementations, the change in the rendering technique could also be triggered by other events such as changing playing speed, switching to three-dimensional (3D) rendering, switching to virtual reality (VR) rendering, etc.

In 330, the system switches a response queue for the access request to a second video buffer queue corresponding to the second rendering technique.

After receiving the request to change the first rendering technique to the second rendering technique, this operation switches the response queue for the video decoder access request to the second video buffer queue corresponding to the second rendering technique (hereinafter abbreviated as "switching operation") to supply the corresponding second consumer with filled buffer units in the second video buffer queue for use in performing the video rendering operation. In other words, in the event that, after performing the switching operation, the system receives an access request from the video decoder for a video buffer queue, the system then uses the second video buffer queue to respond to the access request.

When performing the switching operation, the video decoder typically has several empty buffer units that it previously acquired from the first video buffer queue. After performing the switching operation and in the event that the video decoder requests that the filled buffer units into which video data has been written be entered into the queue, the second consumer corresponding to the second rendering technique acquires the filled buffer units from the second video buffer queue and performs the rendering. Moreover, after the rendering has been completed, the empty buffer units are returned to the second video buffer queue. By requesting exit of the empty buffer units from the video buffer queue, the video decoder can acquire the empty buffer units from the second video buffer queue and write to-be-rendered video data into the empty buffer units from the second video buffer queue. The video-rendering technique that utilizes the second rendering technique is implemented via the above process 300.

In some implementations, the switching operation can be implemented by setting a flag to indicate the use of the second video buffer queue as the response queue. After performing the switching operation, when an access request is received from the video decoder for a video buffer queue, the response to the access request can utilize the video buffer queue corresponding to the flag.

For example, the value of the variable "queue_flag" can be used as the flag. When the queue_flag is set to 1, the response is to be with the first video buffer queue. When the queue_flag is set to 2, the response is to be with the second video buffer queue. Thus, the queue_flag can be set to 2 in this operation. When an access request is subsequently received from the video decoder for a video buffer queue, the value of the queue_flag is read. Since the value of the queue_flag is 2, the second video buffer queue is used to respond to the received request.

In some implementations, the first video buffer queue and the second video buffer queue can adopt a technique of sharing buffer units, or the queues do not share buffer units, i.e., each queue having its respective buffer units. Both of these two techniques are founded on the above implementation process. The techniques are discussed as follows:

(I) Sharing Technique

When this sharing technique is adopted, the first video buffer queue and the second video buffer queue share buffer units. Therefore, after the request to change the first rendering technique to the second rendering technique is received and before the switching operation is performed, each buffer unit in the first video buffer queue can be added to the second video buffer queue, thus increasing the number of buffer units in the second video buffer queue. This facilitates a quick response to the video decoder request and ensures smooth video-playing. In some implementations, the data in the buffer units in the first video buffer queue can be cleared, and these buffer units can be added as empty buffer units to the second video buffer queue.

At the time the switching operation is performed, all or some of the buffer units in the first video buffer queue are filled buffer units. In other words, all or some of the buffer units have to-be-rendered video data written into them. As an aspect, to ensure the continuity of video-playing content and to avoid the loss of video frames, when all the buffer units in the first video buffer queue are added to the second video buffer queue, the filled buffer units in the first video buffer queue can be retained. In other words, all of the filled buffer units in the first video buffer queue remain as filled buffer units and are added as such to the second video buffer queue, and the filled buffer units in the first video buffer queue retain the video image data in each of the filled buffer units. Thus, some of the video image data already filled can be rendered by the second consumer and ultimately presented on the display device to the user.

In addition, after the switching operation is performed, the first consumer corresponding to the first video buffer queue can also return the empty buffer units it has used to the first video buffer queue. To increase the number of buffer units in the second video buffer queue, the empty buffer units corresponding to the first video buffer queue returned by the first consumer to the first video buffer queue can be added to the second video buffer queue. Thus, increasing the number of buffer units in the second video buffer queue is possible. The increasing of the number of buffer units in the second video buffer queue helps expedite the response to the video decoder's request and further assures smoothness of the video-playing.

(II) Non-Sharing Technique

In the non-sharing technique, the first video buffer queue and the second video buffer queue can each have their own buffer units. In this implementation, there is no need to manage the sharing of buffer units between the two video buffer queues.

At the time of the switching operation, the filled buffer units in the first video buffer queue will have had to-be-rendered video data written into the filled buffer units. As an example, to ensure the continuity of video-playing content and to avoid the loss of video frames, after a request to change the first rendering technique to the second rendering technique is received and before the switching operation is performed, the data in each filled buffer unit in the first video buffer queue can be individually copied to an empty buffer unit in the second video buffer queue. Moreover, after the filled video buffer units are copied, the corresponding empty buffer units are set to filled buffer units. Thus, this portion of the video image data that has been filled buffer units in the second video buffer queue by the video decoder can be rendered by the second consumer and ultimately be presented to the user on a display device.

Operation 330 can be implemented with respect to the two techniques, as follows, namely the sharing and the non-sharing of buffer units by the first video buffer queue and the second video buffer queue. Please note that either buffer sharing technique or non-sharing technique is acceptable in some implementations.

As an example, in the case of an application scenario in which a video decoder is bound to buffer units, the mode of implementation, which is sharing buffer units between the first video buffer queue and the second video buffer queue, can be employed. This approach can avoid the video stream resetting operation caused by the use of different buffer units following switching. Thus, neither the execution efficiency of the switching process is affected nor does the user sense that the video-playing is being interrupted or sticking (as a result of interrupting the video that is playing and continuing to play after skipping to the position of the previous interruption). As an example, the video-playing process can avoid playing failures during the playing of streaming video that does not support skipping. In this way, a smooth video-playing process is ensured, and the user's experience is significantly enhanced.

After performing operation 330, the response to the video decoder's request for access to a video buffer queue is the second video buffer queue corresponding to the second rendering technique. The change from the first rendering technique to the second rendering technique is thus completed. The first rendering technique and the second rendering technique are two different rendering techniques. For example, the first rendering technique is either the SurfaceView rendering technique or the TextureView rendering technique, and the second rendering technique is the other one of the SurfaceView rendering technique or the TextureView rendering technique. The consumer corresponding to the SurfaceView rendering technique is a system compositor, and the consumer corresponding to the TextureView rendering technique is the rendering unit of the video-playing application.

So far, implementations of process 300 have been described through the above operations 310 to 330. From the above descriptions, with the use of two concurrent video buffer queues, each of which corresponds to a different rendering technique, when the first rendering technique is to change to the second rendering technique, directly switching the video buffer queue that is the response to the video decoder access request to the second video buffer queue, i.e., to achieve the objective of smooth, dynamic switching of rendering techniques, is possible. Thus, recreating the video buffer queue or allocating memory when changing the rendering technique is not required. Instead, performing a queue switching operation is all that is required. The process 300 can significantly decrease the impact on performance and help to ensure that the video plays smoothly. The process 300 effectively enhances the viewing experience of users. In addition, the switching operation used by process 300 is transparent with respect to the video decoder. In other words, the switching operation does not affect the way in which the video decoder accesses the video buffer queue. Changing the video decoder code is not required, and thus, decreases developer workloads.

Figure 4:
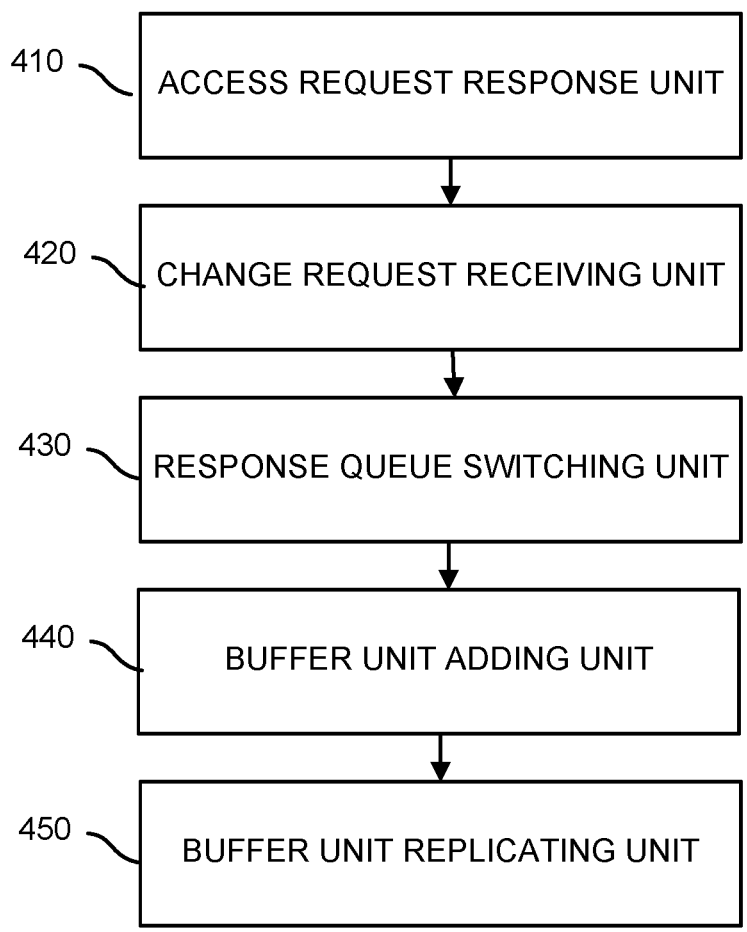
FIG. 4 is a diagram of an embodiment of a device for rendering video.

FIG. 4 is a diagram of an embodiment of a device for rendering video. In some embodiments, the device 400 is configured to perform the process 300 of FIG. 3 and includes: an access request response unit 410, a change request receiving unit 420, a response queue switching unit 430, a buffer unit adding unit 440, and a buffer unit replicating unit 450.

In some embodiments, the access request response unit 410 is configured to respond to an access request from a video data provider using a first video buffer queue corresponding to a first rendering technique.

In some embodiments, the change request receiving unit 420 is configured to receive a request to change the first rendering technique to a second rendering technique.

In some embodiments, the response queue switching unit 430 is configured to switch a response queue for the access request to the second video buffer queue corresponding to the second rendering technique. In some embodiments, the first video buffer queue and the second video buffer queue are concurrent or created in place before video playback begins.

As an example, the first video buffer queue and the second video buffer queue involved in the switching operation performed by the response queue switching unit 430 share buffer units.

In some embodiments, the buffer unit adding unit 440 is configured to, after the change request receiving unit 420 receives a request, add each buffer unit in the first video buffer queue to the second video buffer queue, and trigger the response queue switching unit 430 to operate.

In some embodiments, the buffer unit adding unit 440 is configured to add each buffer unit in the first video buffer queue to the second video buffer queue and retain the filled buffer units in the second video buffer queue to be rendered.

In some embodiments, the first video buffer queue and the second video buffer queue involved in the switching operation performed by the response queue each has its own respective buffer unit(s).

In some embodiments, the buffer unit replicating unit 450 is configured to, after the change request receiving unit 420 receives a request and before triggering the response queue switching unit 430 to operate, individually replicate the data in each filled buffer unit in the first video buffer queue into different empty buffer units in the second video buffer queue, and upon completing the replication, set the corresponding empty buffer units to filled buffer units.

In some embodiments, the response queue switching unit 430 is configured to set a flag to indicate use of the second video buffer queue as the response queue.

In some embodiments, the first rendering technique comprises one of the SurfaceView rendering technique or the TextureView rendering technique, and the second rendering technique includes the other of the TextureView rendering technique or the SurfaceView rendering technique.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 5:
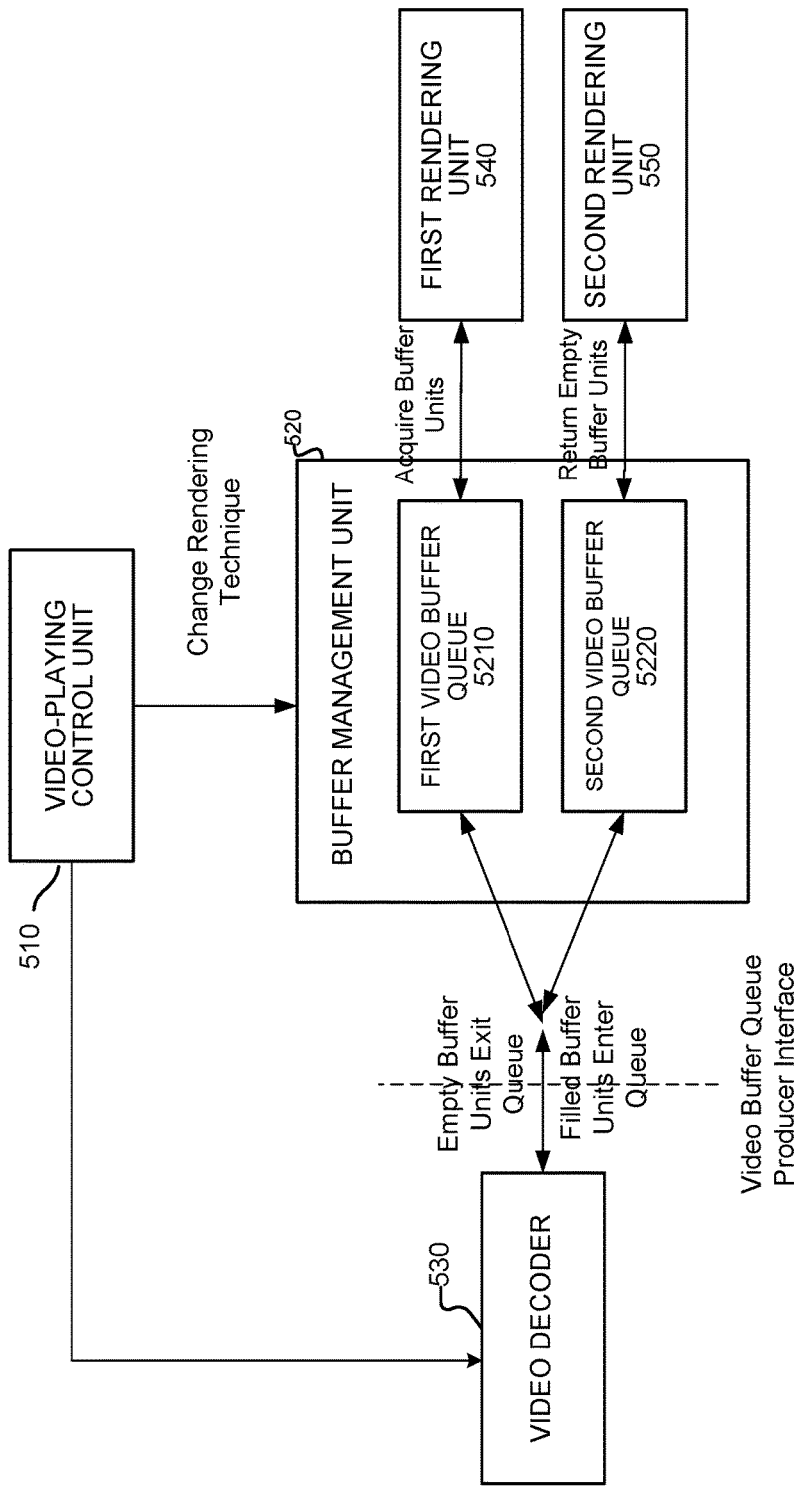
FIG. 5 is a diagram of an embodiment of a system for rendering video.

FIG. 5 is a diagram of an embodiment of a system for rendering video. In some embodiments, the system 500 is configured to perform the process 300 of FIG. 3 and comprises: a video-playing control unit 510, a buffer management unit 520, a video decoder 530, a first rendering unit 540, and a second rendering unit 550.

In some embodiments, the video-playing control unit 510 is configured to generate control signals to control a video-playing process and create a first video buffer queue 5210 and a second video buffer queue 5220 for use by the buffer management unit 520. The control signals include: control signals for controlling starting, pausing, and stopping of decoding by the video decoder 530 and control signals for changing the rendering technique. These control signals can trigger the buffer management unit 520 to perform a queue switching operation. In some implementations, the video-playing control unit 510 can be a unit for controlling the video-playing process in a video-playing application.

In some embodiments, the video decoder 530 is configured to decode coded video image data and write the decoded video image data into the corresponding video buffer queue using a video buffer queue producer interface provided by the buffer management unit 520. In some implementations, the video decoder 530 can be implemented with software, hardware, firmware, or a combination thereof or in some other way. Examples of the video decoder 530 include a MediaCodec video decoder provided by the Android operating system, a V412 video decoder provided by an Alibaba-designed YunOS operating system, etc.

In some embodiments, the buffer management unit 520 is configured to respond to an access request from the video decoder 530 using the first video buffer queue, and after receiving control signals sent by the video-playing control unit 510 to change the rendering technique, perform a queue-switching operation. In other words, the video-playing control unit 510 switches to using the second video buffer queue in response to the access request from the video decoder 530. In some implementations, the buffer management unit 520 could be implemented within an operating system. The operating systems can include: the Android operating system, the YunOS operating system, etc.

In some embodiments, the first rendering unit 540 is configured to read video data stored in the first video buffer queue 5210 and use the first rendering technique corresponding to the first video buffer queue to render video. The second rendering unit 550 is configured to read video data stored in the second video buffer queue 5220 and use the second rendering technique corresponding to the second video buffer queue to render video.

In some implementations, the first rendering technique is the TextureView rendering technique. A function of the first rendering unit 540 can be jointly completed by the rendering unit of the video-playing application and the system compositor. In other words, the rendering unit of the video-playing application is configured to render the video image data acquired from the video buffer queue into a window buffer of the video-playing application. The system compositor is configured to composite and render data already rendered into the window buffer together with other user interface (UI) data awaiting display. Lastly, the rendering results are presented on a display device. The second rendering technique can be the SurfaceView rendering technique. The second rendering unit 550 can be a system compositor. The system compositor takes the video image data acquired from the second video buffer queue and composites and renders the video image data together with other UI data that is to be rendered. Thereupon, the played video is presented on the display device. For example, in the Android system, the system graphics compositor can be a SurfaceFlinger. In the Linux system, the system graphics compositor can be Xserver or Weston.

Of course, in other implementations, the first rendering technique could be the SurfaceView rendering technique, the first rendering unit 540 could be the system compositor, the second rendering technique could be the TextureView rendering technique, and the function of the second rendering unit 550 thus can be completed jointly by the rendering unit of the video-playing application and the system compositor.

The process 300 of FIG. 3 and the system 500 of FIG. 5 were provided in the embodiments described above. In addition, the present application further provides a system.

Figure 6:
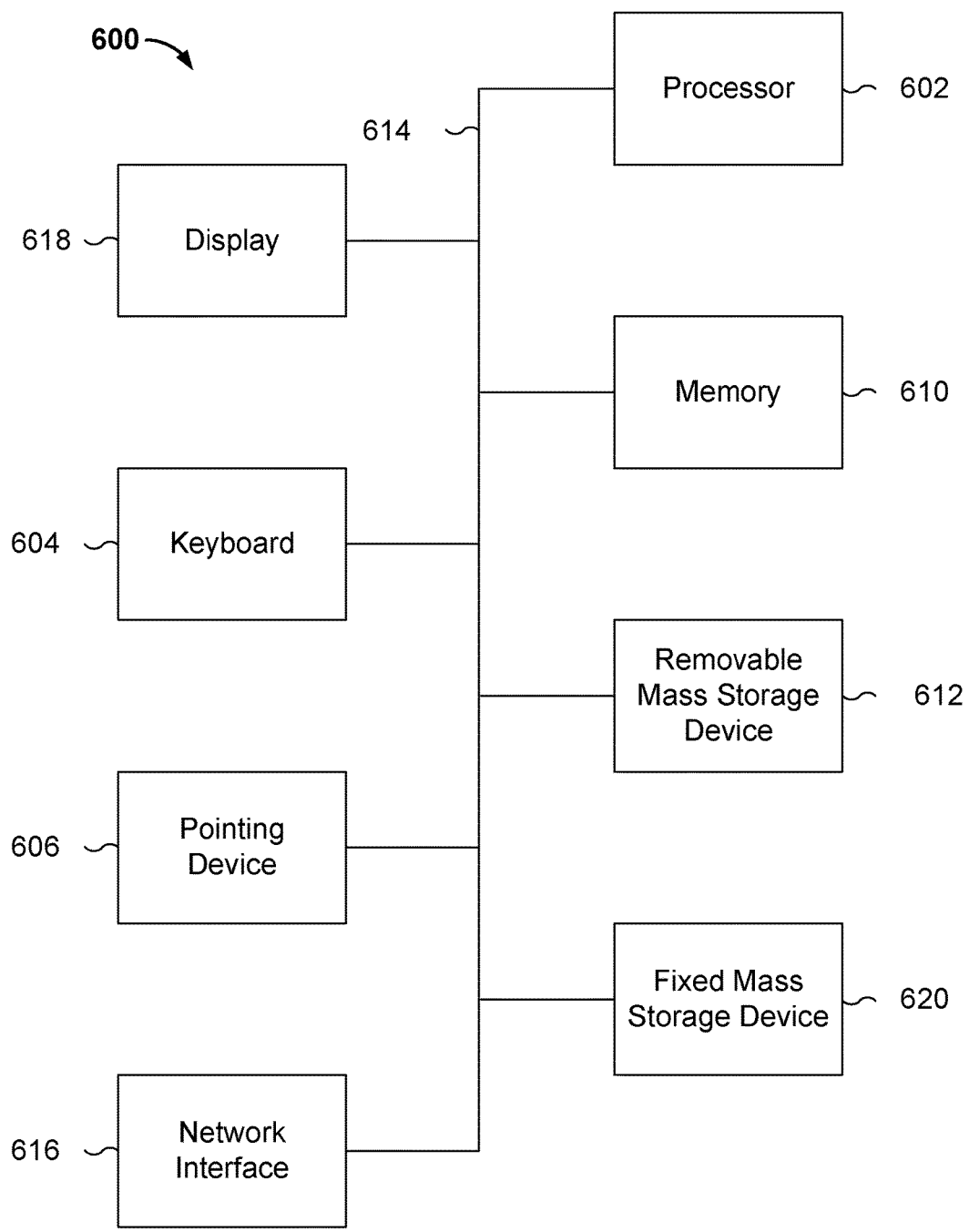
FIG. 6 is a functional diagram illustrating a programmed computer system for rendering video in accordance with some embodiments.

FIG. 6 is a functional diagram illustrating a programmed computer system for rendering video in accordance with some embodiments. As will be apparent, other computer system architectures and configurations can be used to render video. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storages 612 and 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

This description can include several of the exemplary embodiments disclosed below.

In exemplary embodiment 1, a method can include: responding to an access request from a video data provider using a first video buffer queue corresponding to a first rendering technique; receiving a request to change the first rendering technique to a second rendering technique; and switching the response queue for the access request to a second video buffer queue corresponding to the second rendering technique. In some embodiments, the first video buffer queue and the second video buffer queue are concurrent.

In exemplary embodiment 2, the first video buffer queue and the second video buffer queue of exemplary embodiment 1 share buffer units. Therefore, after the request to change the first rendering technique to the second rendering technique is received and before the switching operation is performed, the method further comprises: adding each buffer unit in the first video buffer queue to the second video buffer queue.

In exemplary embodiment 3, the adding of each buffer unit in the first video buffer queue to the second video buffer queue as described in either exemplary embodiment 1 or exemplary embodiment 2 comprises: adding each buffer unit in the first video buffer queue to the second video buffer queue, and retaining the filled buffer units in the second video buffer queue to be rendered.

In exemplary embodiment 4, the first video buffer queue and the second video buffer queue as described in any of exemplary embodiments 1 through 3 each has its own respective buffer units.

In exemplary embodiment 5, after any of exemplary embodiments 1 through 4 has received the request to change the first rendering technique to the second rendering technique and before performing the switching operation, the method further comprises: individually replicating the data in each filled buffer unit in the first video buffer queue into different empty buffer units in the second video buffer queue and upon completing of the replication, setting the corresponding empty buffer units to filled buffer units.

In exemplary embodiment 6, switching the response queue for the access request to the second video buffer queue corresponding to the second rendering technique as described in any of exemplary embodiments 1 through 5 is implemented by: setting a flag to indicate the use of the second video buffer queue as the response queue.

In exemplary embodiment 7, the first rendering technique described in any of exemplary embodiments 1 through 6 comprises one of the SurfaceView rendering technique or the TextureView rendering technique, and the second rendering technique comprises another of the TextureView rendering technique or the SurfaceView rendering technique.

In exemplary embodiment 8, the access request from a video data provider as described in any of exemplary embodiments 1 through 7 comprises: exiting empty buffer units from the queue and entering filled buffer units into the queue.

In exemplary embodiment 9, the video data provider as described in any of exemplary embodiments 1 through 8 comprises: a video decoder.

In exemplary embodiment 10, a device can comprise: an access request response unit configured to respond to an access request from a video data provider using a first video buffer queue corresponding to a first rendering technique; a change request receiving unit configured to receive a request to change the first rendering technique to a second rendering technique; and a response queue switching unit configured to switch the response queue for the access request to the second video buffer queue corresponding to the second rendering technique. In some embodiments, the first video buffer queue and the second video buffer queue are concurrent.

In exemplary embodiment 11, the first video buffer queue and the second video buffer queue involved in the switching operation performed by the response queue switching unit, as described in exemplary embodiment 10, share buffer units, and further comprise: a buffer unit adding unit configured to, after the change request receiving unit receives a request, add each buffer unit in the first video buffer queue to the second video buffer queue, and trigger the response queue switching unit to operate.

In exemplary embodiment 12, the buffer unit adding unit described in either exemplary embodiment 10 or exemplary embodiment 11 is configured to add each buffer unit in the first video buffer queue to the second video buffer queue and retain the filled buffer units in the second video buffer queue to be rendered.

In exemplary embodiment 13, the first video buffer queue and the second video buffer queue involved in the switching operation performed by the response queue switching unit as described in any of exemplary embodiments 10 through 12 each has its own respective buffer units.

In exemplary embodiment 14, any of exemplary embodiments 12 and 13 further comprise: a buffer unit replicating unit configured to: after the change request receiving unit receives a request and before triggering the response queue switching unit to operate, individually replicate the data in each filled buffer unit in the first video buffer queue into various empty buffer units in the second video buffer queue and upon completion of the replication, set the corresponding empty buffer units to filled buffer units in the second video buffer queue.

In exemplary embodiment 15, the response queue switching unit described in any of exemplary embodiments 10 through 14 is configured to set a flag to indicate use of the second video buffer queue as the response queue.

In exemplary embodiment 16, the first rendering technique described in any of exemplary embodiments 10 through 15 comprises one of the SurfaceView rendering technique or the TextureView rendering technique, and the second rendering technique comprises the other of the TextureView rendering technique or the SurfaceView rendering technique.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   responding to an access request from a video data provider using a first video buffer queue corresponding to a first rendering technique;
   receiving a request to change the first rendering technique to a second rendering technique;
   adding a buffer unit in the first video buffer queue to a second video buffer queue; and
   switching the first video buffer queue for the access request to the second video buffer queue corresponding to the second rendering technique, wherein the first video buffer queue and the second video buffer queue are concurrently utilized to play video, and wherein the first video buffer queue and the second video buffer queue share buffer units.

2. The method as described in claim 1, wherein the switching the first video buffer queue for the access request to the second video buffer queue comprises:
   setting a flag to indicate that the second video buffer queue is used as a response queue.

3. The method as described in claim 1, wherein:
   the first rendering technique comprises a SurfaceView rendering technique; and
   the second rendering technique comprising a TextureView rendering technique.

4. The method of claim 1, wherein:
   the first rendering technique comprises a TextureView rendering technique; and
   the second rendering technique comprising a SurfaceView rendering technique.

5. The method as described claim 1, wherein the video data provider comprises a video decoder.

6. A method, comprising:
   responding to an access request from a video data provider using a first video buffer queue corresponding to a first rendering technique;
   receiving a request to change the first rendering technique to a second rendering technique;
   adding a buffer unit in the first video buffer queue to a second video buffer queue;
   retaining a filled buffer unit in the second video buffer queue; and
   switching the first video buffer queue for the access request to the second video buffer queue corresponding to the second rendering technique, wherein the first video buffer queue and the second video buffer queue are concurrently utilized to play video, and wherein the first video buffer queue and the second video buffer queue share buffer units.

7. A method, comprising:
   responding to an access request from a video data provider using a first video buffer queue corresponding to a first rendering technique;
   receiving a request to change the first rendering technique to a second rendering technique;
   replicating data in filled buffer units in the first video buffer queue into empty buffer units in a second video buffer queue;
   upon completing replication, setting the corresponding empty buffer units in the second video buffer queue to filled buffer units; and
   switching the first video buffer queue for the access request to the second video buffer queue corresponding to the second rendering technique, wherein the first video buffer queue and the second video buffer queue are concurrently utilized to play video, wherein the first video buffer queue and the second video buffer queue share buffer units.

8. A method, comprising:
   responding to an access request from a video data provider using a first video buffer queue corresponding to a first rendering technique, wherein the access request from the video data provider comprises: an exit of an empty buffer unit from the first video buffer queue and an entry of a filled buffer unit into the first video buffer queue;
   receiving a request to change the first rendering technique to a second rendering technique; and
   switching the first video buffer queue for the access request to a second video buffer queue corresponding to the second rendering technique, wherein the first video buffer queue and the second video buffer queue are concurrently utilized to play video.

9. A system, comprising:
   a hardware processor; and
   a memory coupled with the hardware processor, wherein the memory is configured to provide the hardware processor with instructions which when executed cause the hardware processor to:
   respond to an access request from a video data provider using a first video buffer queue corresponding to a first rendering technique;
   receive a request to change the first rendering technique to a second rendering technique;
   add a buffer unit in the first video buffer queue to a second video buffer queue; and
   switch the first video buffer queue for the access request to the second video buffer queue corresponding to the second rendering technique, wherein the first video buffer queue and the second video buffer queue are concurrently utilized to play video, and wherein the first video buffer queue and the second video buffer queue share buffer units.

10. The system as described in claim 9, wherein the switching of the first video buffer queue for the access request to the second video buffer queue comprises to:
    set a flag to indicate that the second video buffer queue is used as a response queue.

11. The system as described in claim 9, wherein:
    the first rendering technique comprises a SurfaceView rendering technique; and
    the second rendering technique comprising a TextureView rendering technique.

12. The system as described in claim 9, wherein:
    the first rendering technique comprises a TextureView rendering technique; and
    the second rendering technique comprising a SurfaceView rendering technique.

13. A system, comprising:
    a hardware processor; and a memory coupled with the hardware processor, wherein the memory is configured to provide the hardware processor with instructions which when executed cause the hardware processor to:
  respond to an access request from a video data provider using a first video buffer queue corresponding to a first rendering technique;
  receive a request to change the first rendering technique to a second rendering technique;
  add a buffer unit in the first video buffer queue to a second video buffer queue;
  retain a filled buffer unit in the second video buffer queue; and
  switch the first video buffer queue for the access request to the second video buffer queue corresponding to the second rendering technique, wherein the first video buffer queue and the second video buffer queue are concurrently utilized to play video, and wherein the first video buffer queue and the second video buffer queue share buffer units.

14. A system, comprising:
a hardware processor; and
a memory coupled with the hardware processor, wherein the memory is configured to provide the hardware processor with instructions which when executed cause the hardware processor to:
  respond to an access request from a video data provider using a first video buffer queue corresponding to a first rendering technique;
  receive a request to change the first rendering technique to a second rendering technique;
  replicate data in filled buffer units in the first video buffer queue into empty buffer units in the second video buffer queue;
  upon completing replication, set the corresponding empty buffer units in a second video buffer queue to filled buffer units; and
  switch the first video buffer queue for the access request to the second video buffer queue corresponding to the second rendering technique, wherein the first video buffer queue and the second video buffer queue are concurrently utilized to play video, and wherein the first video buffer queue and the second video buffer queue share buffer units.

15. A computer program product being embodied in a tangible non-transitory computer readable storage medium and comprising computer instructions for:
  responding to an access request from a video data provider using a first video buffer queue corresponding to a first rendering technique;
  receiving a request to change the first rendering technique to a second rendering technique;
  adding a buffer unit in the first video buffer queue to a second video buffer queue; and
  switching the first video buffer queue for the access request to the second video buffer queue corresponding to the second rendering technique, wherein the first video buffer queue and the second video buffer queue are concurrently utilized to play video, and wherein the first video buffer queue and the second video buffer queue share buffer units.

* * * * *